May 28, 1957 G. R. ERICSON 2,793,634
AUTOMATIC STARTING DEVICE
Filed April 2, 1951 6 Sheets-Sheet 1

INVENTOR.
George R. Ericson

May 28, 1957

G. R. ERICSON 2,793,634

AUTOMATIC STARTING DEVICE

Filed April 2, 1951

INVENTOR.

*George R. Ericson*

INVENTOR.
George R. Ericson

May 28, 1957 G. R. ERICSON 2,793,634
AUTOMATIC STARTING DEVICE
Filed April 2, 1951 6 Sheets-Sheet 4

INVENTOR.
George R. Ericson

May 28, 1957 G. R. ERICSON 2,793,634
AUTOMATIC STARTING DEVICE
Filed April 2, 1951 6 Sheets-Sheet 5

INVENTOR.
George R. Ericson

May 28, 1957 G. R. ERICSON 2,793,634
AUTOMATIC STARTING DEVICE
Filed April 2, 1951 6 Sheets-Sheet 6
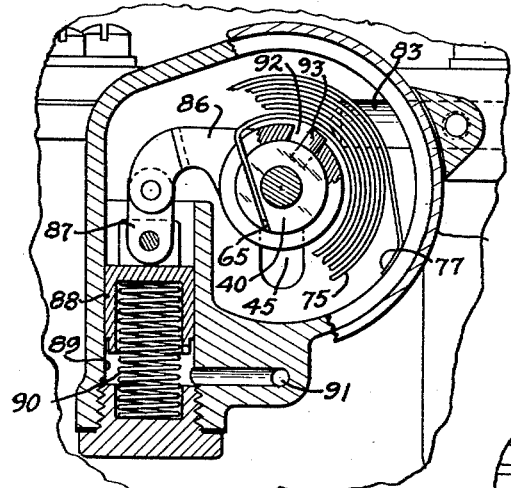
FIG. 8.
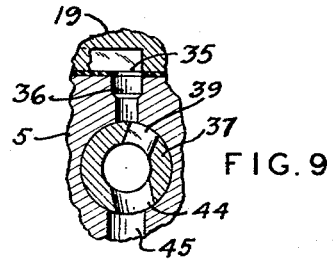
FIG. 9.
FIG. 11.
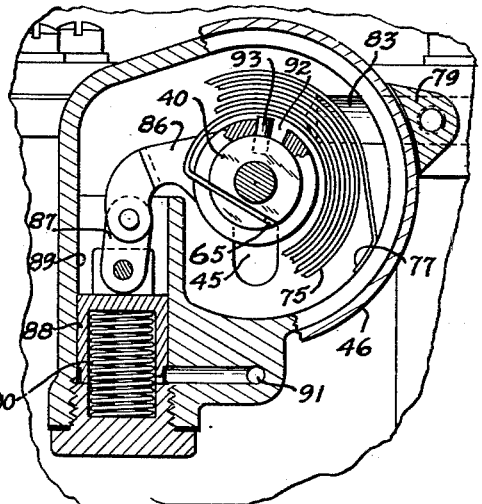
FIG. 10.
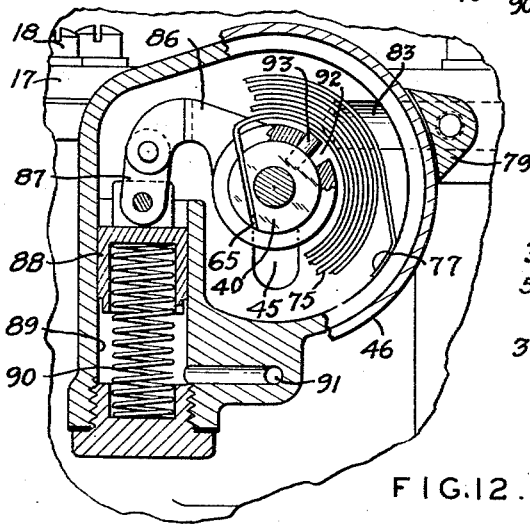
FIG. 12.
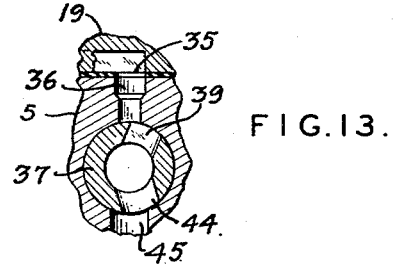
FIG. 13.
INVENTOR.
George R. Ericson

United States Patent Office 2,793,634
Patented May 28, 1957

2,793,634

AUTOMATIC STARTING DEVICE

George R. Ericson, Kirkwood, Mo., assignor, by mesne assignments, to ACF Industries, Incorporated, New York, N. Y., a corporation of New Jersey Application April 2, 1951, Serial No. 218,781

19 Claims. (Cl. 123—179)

This invention relates to automatic starting devices for internal combustion engines, and especially to engines which are equipped with carburetors of the anterior throttle type. With carburetors of the posterior throttle type, where it was desired to control the starting of the engine by means of a switch connected with the throttle of the engine, it has been customary to use devices such as shown in the patents to Collins, 2,399,542, and Coffey, Re. 22,385, or Ericson, 2,147,019. The present invention contemplates the use of one or more of the principles involved in the above mentioned patents. Certain features disclosed herein are claimed in copending applications, Serial No. 164,544, filed May 26, 1950, and Serial No. 187,887, filed October 2, 1950, both in the name of Olin Eickmann, and also Coffey Patent No. 2,340,736.

In carburetors of the anterior throttle type, it is possible to interfere seriously with efficient cold starting by moving the throttle to an open position when the engine is cold. On the other hand, the engine may refuse to start if the throttle valve is left in the closed or idling position during cranking when the engine is hot.

With automatic starting devices of the type described in the above patents, the throttle is required to be moved by the operator to at least a minimum, predetermined, open position in order to actuate the electric starter for cranking the engine. Where no air choke valve is provided, as in an anterior throttle carburetor, this opening of the throttle may defeat or impair the starting of the engine if the temperature is low because insufficient fuel may be supplied to the cylinders. Up to the present, it has not been feasible to apply these starting devices to anterior throttle carburetors.

One of the difficulties with previously known carburetors has been the fact that in order to obtain reasonably satisfactory vaporization of the mixture and fairly even distribution to the cylinders, it has been necessary to provide heating devices, such as manifold hot spots and the like, to supply heat to the carburetor and mixture. Such devices are completely useless during cold starting which is the time when they are most needed, because the cold engine cannot act as a source of heat. Accordingly, it is only when the engine has been started and warmed up that the carburetor and manifold heating devices can be effective. With previous types of carburetors, it is necessary to supply some heat during normal operation because of the imperfect distribution and vaporization characteristics. Such heating devices do additional harm due to the build up of heat in the carburetor after the engine had been stopped, causing boiling of the gasoline in the fuel bowl of the carburetor and percolation through the nozzle into the manifold, and resulting in difficulty in restarting the engine while it was hot. The application of heat to the manifold also carries with it the penalty of power reduction, due to loss of volumetric efficiency.

One of the objects of my invention is to provide a new and improved automatic starting device for application to carburetors generally, and particularly to those such, for instance (but not exclusively), of the anterior throttle type, which can be started most effectively with the throttle set in a partly open position which is varied according to temperature.

Another object of my invention is to provide a new and improved mixture control device for controlling the fuel mixture supplied to an internal combustion engine during its starting and warm-up periods and also at normal operating temperature.

Another object of my invention is to provide a new and improved mixture control device for controlling the proportions of fuel and air supplied to the engine and varying such proportions in accordance with the engine suction.

Another object of the present invention is to provide a new and improve charge forming device for internal combustion engines capable of providing a more perfectly vaporized mixture of fuel and air to the engine without the necessity for addition of heat or the application of high suction.

Another object of the invention is to improve the distribution and vaporization characteristics of a carburetor by causing the fuel to be vaporized in the center of a conduit without striking its walls. This is because drops of fuel which strike the walls are likely to drain down the sides of the walls and be distributed unevenly to the cylinders in liquid form which, of course, causes loss of economy and power.

Other objects and advantages will be seen from the following specification and accompanying drawings, referring to which:

Figure 1:
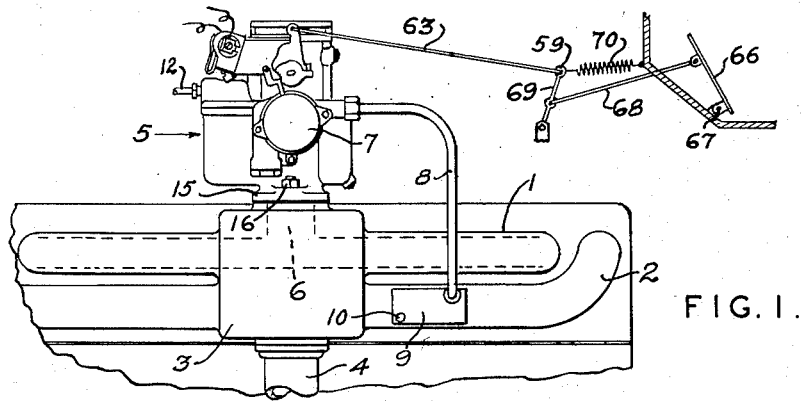
Figure 1 is a diagrammatic view showing my improved carburetor and automatic starting device mounted on the manifold of an internal combustion engine.
Figure 2:
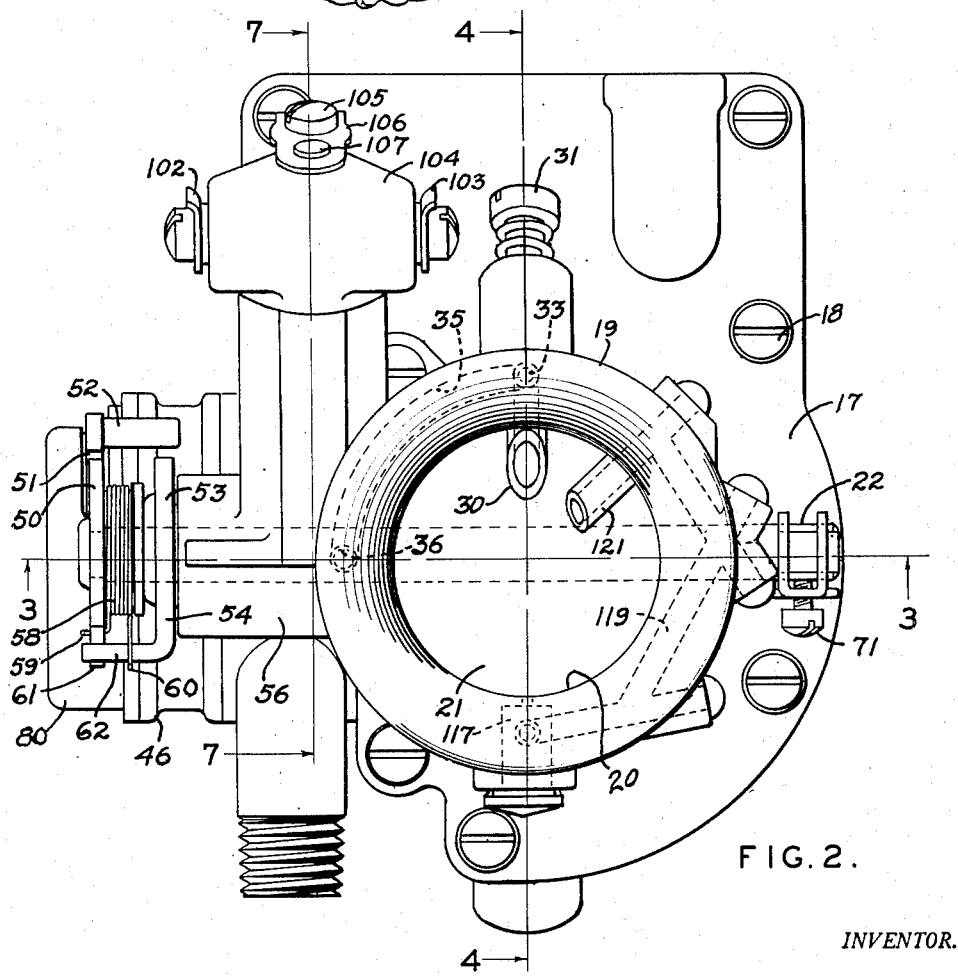
Figure 2 shows a plan view of the carburetor.
Figure 3:
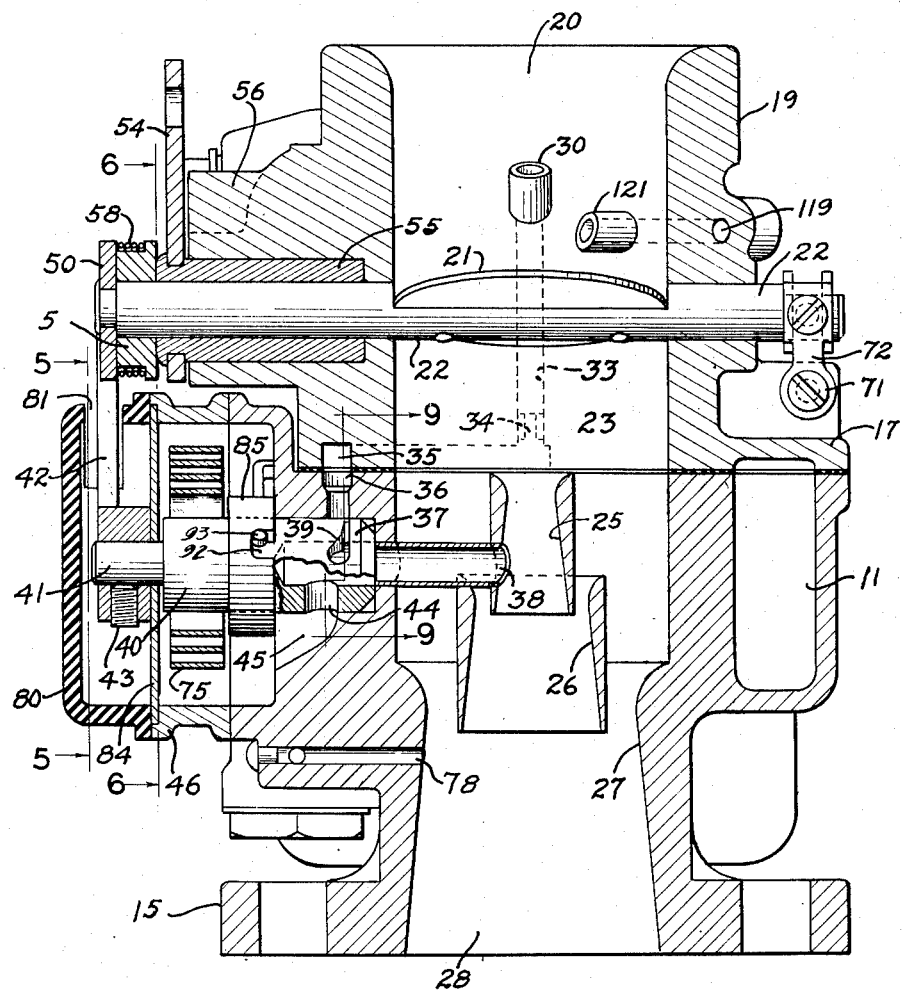
Figure 3 shows a sectional elevation of the carburetor and automatic starting device taken along the line 3—3 in Figure 2 looking in the direction of the arrows.
Figure 5:
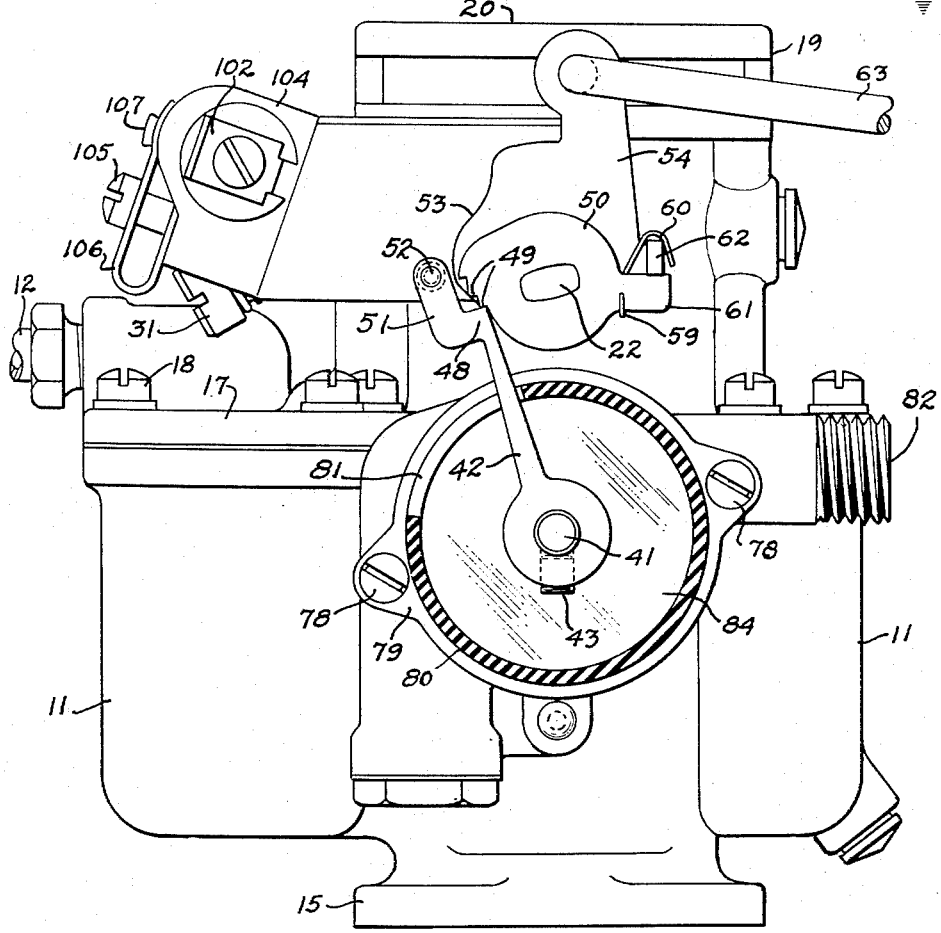
Figure 5 is an elevation of the device shown in Figures 2 and 3 with the control housing cut away along the section lines 5—5 looking in the direction of the arrows.
Figure 6:
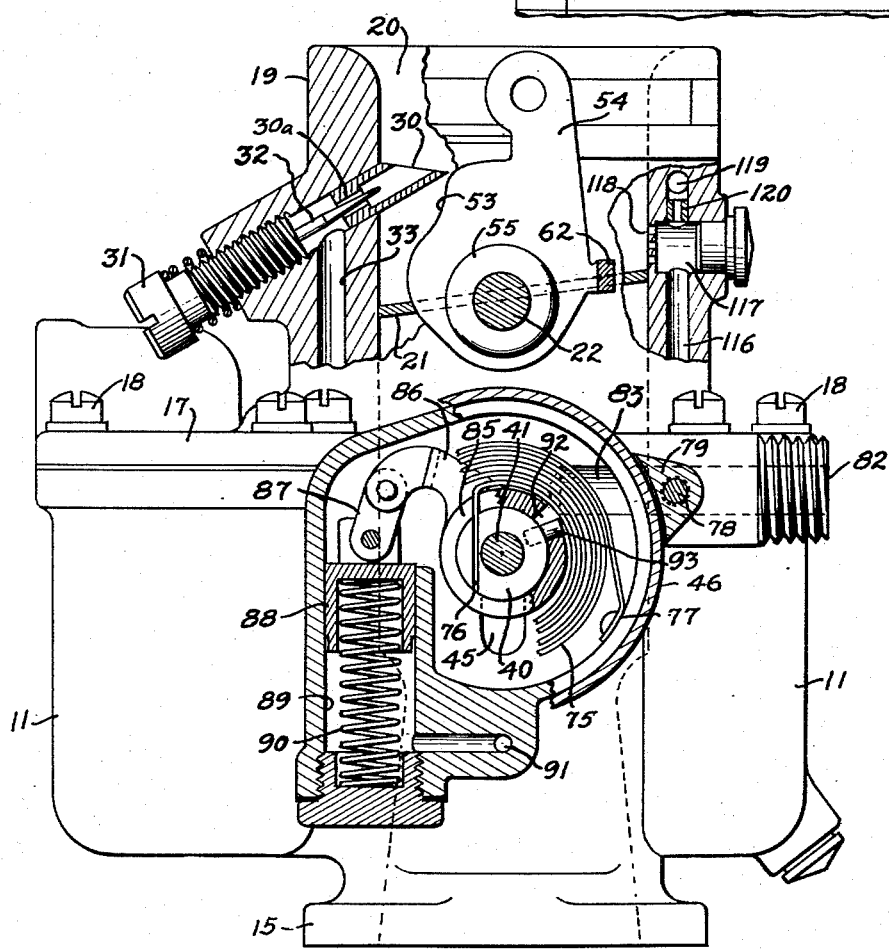

Figure 6 is another view of the device shown in Figures 2, 3 and 5 with parts of the control housing in the lower part of the figure taken along the section line 6—6 of Figure 3 and parts of the air inlet taken along the section line 4—4 of Figure 2 looking in the direction of the arrows. The parts are shown in their cold cranking positions.

Figure 7:
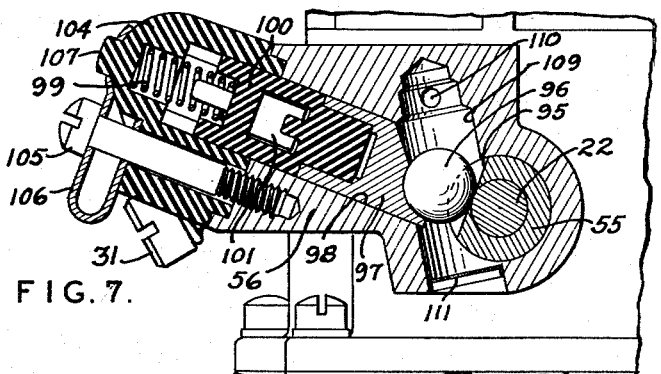

Figure 7 is a detail view taken along the line 7—7 in Figure 2 looking in the direction of the arrows.

Figure 8 is a detail view showing the control mechanism taken along the line 6—6 of Figure 3 looking in the direction of the arrows, parts being broken away for better illustration of others. The view is similar to a part of Figure 6, except that the piston and related parts of the control mechanism are in a different position for fast idling and warm-up.

Figure 9 is a sectional view of the control valve taken along the broken section lines 9—9 of Figure 3 looking in the direction of the arrows. This figure shows the position of the valve when it has been moved to partly open position as by the suction developed by the engine starting to run under its own power when it has been started at low temperature.

Figure 10 is another view of the parts shown in Figure 8 with the piston in the fully downward position to which it would be moved by heat and suction during normal running.

Figure 11 is a view similar to Figure 9 showing the control valve in a position corresponding to Figure 10.

Figure 12 is a view corresponding to Figures 8 and 10 with the piston in its partially released position, as it would be at low suction, as during acceleration, and at high temperature.

Figure 13 is a view corresponding to Figures 9 and 11 with the control valve in a position corresponding to Figure 12.

Figure 14:
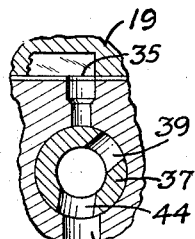

Figure 14 is a view similar to Figures 9, 11, and 13, but showing the valve in the position corresponding to the position of the parts shown in Figure 6 which they would occupy when the engine is cold and not running or being cranked.

Figure 15:
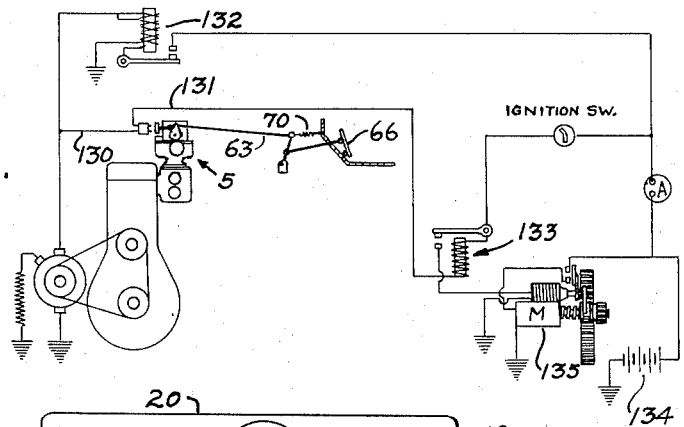

Figure 15 is a diagrammatic representation of the starter circuit.

The reference numeral 1 indicates the intake manifold of an internal combustion engine which is conveniently mounted adjacent the exhaust manifold 2 from which an exhaust jacket or hot spot 3 extends to surround the intake manifold with hot gases. The exhaust gas discharge outlet is conveniently indicated at 4. A carburetor 5 is mounted on the riser 6 of the intake manifold and is heated by the hot spot to a slight degree as compared with present day practice for conventional posterior throttle carburetors. The carburetor only requires a small amount of heat for efficient operation on account of the high efficiency of the vaporizing action of my design of an anterior throttle carburetor.

A control and thermostat housing 7 is mounted on the carburetor and receives heat for warming the thermostat through a tube 8 from the conventional stove 9 mounted on the exhaust manifold and having an opening 10 through which it may receive air. The carburetor comprises the main body member 5 containing a conventional float chamber 11 to which fuel is supplied through a conduit 12 and in which the fuel is maintained at a substantially constant level A—A by float 13 and float valve 14 of conventional design.

The carburetor is provided with an attaching flange 15 and hold down bolts 16 for securing it to the manifold in a conventional manner. The float chamber is provided with a cover 17 held by conventional screws 18 or the like. The air horn or inlet 19 extends upwardly from the bowl cover 17 and contains the air inlet passageway 20, the flow through which is controlled by a throttle valve 21 mounted on a shaft 22.

As distinguished from present day commercial carburetors, the throttle valve 21 is mounted in the mixing conduit at a point anterior to the mixing chamber 23, the fuel nozzle 24, and the venturi stack 25—26—27, so that the flow of mixture through the conduit and the discharge outlet 28 is not impeded or distorted by any throttle valve after it passes through the venturi tubes.

Figure 4:
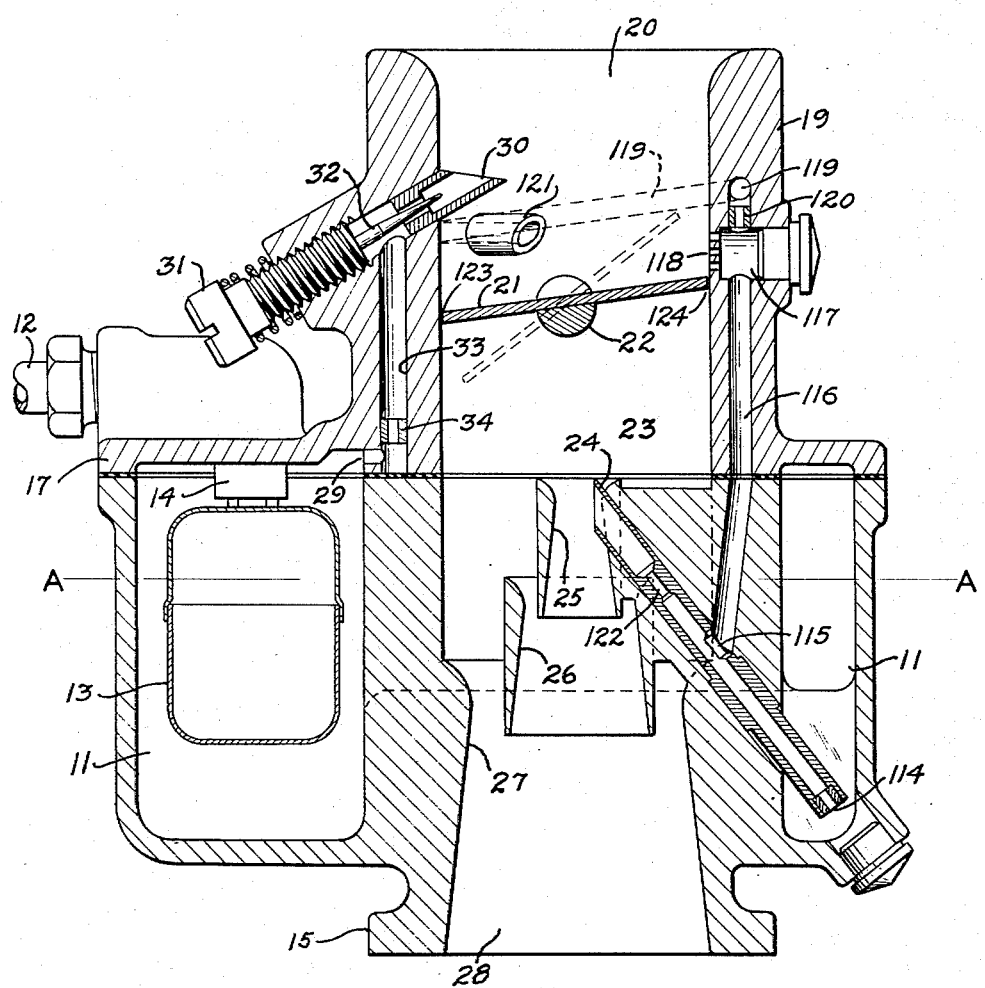
Figure 4 is a sectional elevation of the device shown in Figure 2 taken along the line 4—4 looking in the direction of the arrows.

Float chamber 11 is sealed against the atmosphere, except for the passage 29, 33 (Fig. 4) which is connected to an air inlet tube 30 in the air horn anterior to the throttle and, preferably, with its open end turned upward at an angle against the incoming air stream to function in the manner of a Pitot tube. Communication between the atmosphere and passage 33 is further controlled by a tapered needle valve (32) having an exposed adjusting head 31. This needle valve has a cylindrical portion between its thread and its tapered extremity which, when moved into restriction 30a, establishes a minimum effective air inlet passage. A metered restriction 34 is located in passage 33.

Passage 33 is also connected by a curved cross duct 35 (Figs. 2 and 3) to a port 36 which leads through a hollow plug valve 37 to a tube 38 opening into primary venturi tube 25. The mouth of this tube is somewhat below the level of the mouth of main nozzle 24. The plug valve is journalled in the wall of the carburetor mixture conduit and has a keyhole slot 39 for cooperating with air inlet port 36. Valve 37 has an outward extension 40 with a reduced extremity 41 on which is secured a lever 42 by means of a set screw 43. The plug valve also has a second aperture 44 for cooperating with a slot 45 leading to the interior of a housing 46 to be referred to hereafter.

Lever 42 is provided near its free extremity with an abrupt shoulder, latch, or pawl 48 which cooperates with the serrations or teeth 49 on an arm 50 rigid with throttle shaft 22. Lever 42 also has an extension 51 which projects beyond shoulder 48, and a pin 52 for contact by an unloading cam 53 formed on throttle operating lever 54 which is rotatable relative to throttle shaft 22.

Lever 54 (Figs. 3 and 6) is rigid with a sleeve 55 which journals a portion of the throttle shaft and, itself, rotates within a boss 56 formed on the carburetor body. Arm 50 is spaced from the end of sleeve 55 by a bushing 57. Arm 50 is yieldably connected to throttle control lever 54 by means of a torsion spring 58 which is wrapped around bushing 57 (Figs. 2 and 3) and provided with hooked extremities 59 and 60, respectively, to engage a radial projection 61 on arm 50 and an axial finger 62 on lever 54 which overlies projection 61. The projection and finger are normally held in contact with each other, as shown in Fig. 5, by the pressure of spring 58 in such a manner that operation of the lever 54 in an anticlockwise direction by means of the accelerator connection 63, will normally move the throttle yieldingly toward open position through the medium of spring 58.

The throttle disk may be initially prevented from opening by latching of shoulder 48 in one of the teeth 49 on arm 50 in which case throttle operating lever 54 may be moved about half way toward open position without actually opening the throttle at all. The construction and arrangement shown is such that when cam 53 engages pin 52, shoulder 48 is shifted out of contact with teeth 49, whereupon the throttle valve can snap open under the influence of spring 58. This is for the purpose of permitting "unloading" or sweeping out of excess fuel which may collect in the manifold under certain conditions.

It will be understood that the use of the conventional accelerator pedal 66 is contemplated, this being pivoted to a rigid support, as at 67 and connected to link 63 by means of a rod 68 and a lever 69. Spring 70 normally returns the throttle to its idling position which is adjustably fixed by an adjusting screw 71 carried by an arm 72 on the throttle shaft opposite lever 54 (Fig. 3).

From the above, it will be seen that while the throttle is normally under the control of the operator and may be opened and closed by him at will, that condition does not apply when the control lever 42 is in its cold starting position, as indicated in Fig. 5. Under such condition, depression of accelerator pedal 66 against the return spring will not cause any opening of the throttle until during the last part of the pedal depression. Cam 53 then forces lever 42 in an anticlockwise direction sufficiently to displace the shoulder 48 from the path of the serrations 49, after which the throttle may be moved to its fully open position by further action of the accelerator pedal 66.

Under such conditions, depression of the accelerator pedal 66 against the return spring 70 will not cause any opening of the throttle until after lever 54 has reached a position corresponding to normally half-open throttle position, or the latter part of the pedal depression. During this latter part of pedal depression, cam 53 forces lever 52 out of engagement with the notch 49, which will allow the torsion spring 59 to open the throttle another step. For each amount of displacement of lever 42 corresponding to the width of the notch 49, the throttle will open a corresponding amount equal to the degree of rotation provided by the notches 49. After the shoulder 48, which is the last notch, further movement of lever 54 engages the steep part of cam 53 with cam follower 52, thus releasing lever 50 for free movement under action of the torsion spring 59, and the throttle accordingly moves to a full open position. The number of teeth provide is, of course, wholly optional.

The function of plug valve 37, with its ports 39 and 44, is to control the suction applied to the float bowl and the flow of heated air by suction from stove 9 through hot air tubing 8 to the interior of thermostat housing 46. Shaped valve port 39 variably covers or uncovers communication between the interior of the plug valve and tube 38 and port 36 which is connected through passage 33 to air tube 30 and to float chamber 11 through the restriction 34 and the port 29. Thus, by rotation of shaft 40 and the plug valve, the effect of suction posterior to the throttle upon the pressure in the fuel chamber 11 can be controlled, and it will be understood that the constant bleed from the atmospheric pressure existing anterior to the throttle 21 is balanced against the volume of suction available through the keyhole valve slot 39.

A bimetallic coil thermostat 75 mounted in housing 46 around valve shaft 40 has its inner end secured in a slot 76 in valve shaft 40 (Fig. 6) and its outer end is attached to housing 46, as indicated at 77. The housing is rotatable for adjusting the tension of the thermostat and is secured in position by long screws 78 extending through ears 79 on a housing cap 80 of insulating material into tapped openings in the carburetor body. A partition 84 is placed between housing 46 and cap 80. The cap is cut away, as at 81, to accommodate lever 42.

In the same manner as valve slot 39 regulates the application of suction to the upper part of the float chamber, valve aperture 44 regulates the application of suction to slot 45 and the interior of the thermostat housing to draw air heated by the stove 9 through the tubing 8 and fitting 82, for heating the thermostat, and thence into the carburetor through tube 38. Preferably, tube 38 is of ample size so that valve slot 39 and aperture 44 constitute the effective metering points. Heat tube 8 and its connections 82 and 83 are of ample size relative to valve aperture 44 so that no suction can be built up in housing 46.

Loosely carried on valve shaft 40 is a partially rotatable collar 85 from which projects a curved arm 86 connected by means of a short link 87 to a piston 88, the upper end of which is exposed to the substantially atmospheric pressure in housing 46. The piston slides in a cylinder 89 and is normally biased upwardly by means of spring 90. The inner end of the cylinder is connected to the mixing conduit of the carburetor by means of a small passage 91 so that the piston will be responsive to suction posterior to the throttle. Collar 85 has a recess 92 receiving a pin 93 projecting from valve stem 40, these parts constituting a lost motion operative connection between suction piston 88 and valve 37.

An automatic self starting circuit switch, corresponding to that shown in Coffey Reissue Patent No. 22,385, is shown in Fig. 7, other elements of the starting system being shown in Fig. 15.

A part of sleeve 55, rigid with throttle control lever 54, is cut away to form a cam surface 95 capable of operating a ball 96 which may lie between the cam and the recessed end of a plunger 97 slidable in a bore 98 formed in the carburetor body. Plunger 97 is biased toward the cam 95 by a spring 99 which rests against the upper portion 100 of the plunger which is formed of insulating material and carries a spring contact member 101 capable of forming an electric connection between the terminals 102 and 103 (Figs. 2 and 5) for connection to the control wires 130, 131, leading, respectively, through reverse current cutout 132 and starter relay 133 to battery 134 (Fig. 15). Relay 133 controls starter 135.

Spring 99 is mounted in an insulator cap 104 which is retained by the screw 105 and spring 106 receiving a nubbin 107 on the cap, as shown in Figure 7.

A chamber 109 is formed in the body of the carburetor in a position to intersect bore 98 and the bore which contains sleeve 55 in such a manner as to permit ball 96 to move upwardly under the influence of suction applied through the port 110 from a point in the mixing conduit posterior to the throttle valve.

When the ball moves upwardly, it can no longer form a push member for plunger 97 and cannot cause the closing of the connection between the terminals 102 and 103. At the lower end of chamber 109 is a screen 111 which permits free entry of air from the atmosphere under the influence of suction to lift the ball, while keeping out dirt and foreign matter which might clog the mechanism. Member 111 also prevents ball 96 from falling out of chamber 109 under abnormal conditions.

The fuel proportioning elements of the carburetor comprise the constant level supply chamber 11 and nozzle 24 having a restricting connection 114 with fuel in the bowl, and various pressure, control, balance, and compensating mechanisms which will now be described.

The nozzle 24 receives fuel through the calibrated opening 114 and receives air through a port 115 in the wall of the nozzle communicating with an air bleed passage 116 which extends upwardly to a chamber 117 located just above the level of the upper edge of the throttle valve 21 when it is in closed position. A series of openings, as indicated at 118, permit the entrance of air to the chamber 117 when the throttle is in closed position, and these are gradually presented to intake suction seriatim as the valve is opened.

An additional passage 119 is connected to chamber 117 by means of restricted passage 120 and extends to a projecting intake tube 121 mounted in the air horn in such position that the upwardly moving side of the butterfly nozzle 21 approaches and restricts it as the throttle approaches wide open position. Thus, it will be seen that air taken from the air inlet of the carburetor may be drawn downwardly through the passage 116 to discharge with a spray of gasoline from the upper end of the main nozzle 24.

Due to the intermingling of the gasoline and air at bleed port 115 and in the restricted portion 122 and the enlarged tip of the nozzle, a fairly well atomized spray of gasoline is discharged at the throat of primary venturi tube 25 with sufficient velocity to carry the spray over toward the downwardly moving stream of air at the crack 123 between a slightly open throttle valve and the wall of the mixing conduit.

When the throttle is in nearly closed position, this crescent shaped stream or blanket of air is moving so rapidly that it prevents impingement of the drops of the fuel against the wall of the carburetor, and further atomizes them in a whirlwind or turbulent area which forms below throttle 21. A similar blanket of air coming down past the opposite edge of the throttle at the crack 124 further assists in the atomization of the fuel which is then carried down through the venturi stack and discharged into the intake manifold. The high velocities of the air at the points where fuel is brought in contact with it, the blanket of air which prevents fuel from striking the wall and draining down it in the absence of irregular surfaces, and projections in the air stream combine to produce a highly efficient vaporization of fuel with a minimum heat supply which, of course, is highly desirable to prevent loss of volumetric efficiency.

During warm-up, when valve aperture 44 is substantially open to slot 45 (Fig. 9) the emission of air from tube 38 into the primary venturi tube further aids in thorough atomization of the fuel. At times, particularly when the throttle is nearly closed, a low pressure area exists immediately beneath the throttle plate. This causes an updraft through the primary venturi and past the mouth of the main nozzle. The air stream emerging from tube 38 rises past the nozzle tip at such time, exerting a strong atomizing effect.

In operation, fuel is supplied to the float chamber 11 through the conduit 12, and is maintained at a substantially constant level A—A by the float 13 and the float valve 14 in a well known manner. Suction from the engine is applied to the discharge outlet 28 through the intake manifold 1.

When the throttle valve 21 is closed, or in its idle position, the full suction of the engine is applied at the primary venturi tube. The effect of the suction to draw fuel from chamber 11 is diminished first by the calibrated restrictions 114 and 122 in the main nozzle, and further by the bleeding of air at the port 115.

Regardless of the flow reducing factors mentioned, there would be more gasoline flowing when the throttle is closed than when it is open if some other means was not provided to reverse this characteristic. I accomplish this by applying suction taken from a point in the mixing conduit posterior to the throttle to the upper part of the float chamber. To this end, suction from the mixing conduit is conducted through the tube 38, key hole valve slot 39, and passages 36 and 35 to port 29 leading into the upper part of the float chamber. The upper part of the float chamber is closed to the atmosphere except for the vent passage 30—33—29, which is connected to the air inlet above the throttle, and which is restricted at 34 and 32. Thus the static suction applied to the fuel in the float bowl 11 at metering jet 114 is nearly balanced by suction applied to the air above the fuel at the port 29.

During part throttle operation when the throttle is only slightly open, ports 118 are partially blocked and cut off from atmosphere by the edge of valve disc 21, so as to limit the amount of air which can be drawn into the nozzle at the port 115. Since this air has the effect of relieving the suction applied to the main nozzle, reducing the air bleed through passage 116 has the effect of increasing the amount of fuel delivered as the throttle is opened. The proportions of air and fuel can thereby be kept substantially constant or varied as desired for different positions of the throttle in the part throttle range.

It will be seen that passage 121, 119, 120 is constantly open and capable of supplying a small stream of air to chamber 117, passage 116 and port 115 during idle and part throttle operation. This air is duly considered in the calibration of the carburetor so as to give a correct part throttle mixture, which is normally adjusted to give maximum economy consistent with smooth operation. The interference of the throttle with air flow during part throttle produces a slight build up of pressure in tube 121 with consequent increase in its air bleeding effect.

For wide open throttle operation, a richer mixture is required to obtain full power. In order to obtain this, tube 121 is extended into the air horn to a point where it will be partially blocked by the upwardly moving side of the throttle disc when it approaches the wide open position. Under this condition, ports 118 are no longer affected by the edge of the throttle, but the substantial reduction in bleeding through passage 121, 119, 120 results in a net reduction of the total amount of air admitted to port 115 when the end of bleed tube 121 is restricted. This results in the desired enrichment of the mixture acceleration and for wide open throttle operation.

In order to provide a step-up of the mixture when the speed of the engine is low, or conversely, a reduction of the richness in response to increase in engine speed, it will be noted that the tube 38 may be carried all the way into one of the venturi as shown in Fig. 3. When the engine speed is low, the rate of flow through the venturi is low and the suction increase due to the venturi action is negligible. In other words, the suction in the venturi is nearly the same as that existing below the throttle but anterior to or outside of the venturi. Thus, the mixture can be calibrated to give maximum power under this condition. When the engine speed increases, the rate of flow through the venturi also increases and this builds up the suction at a more rapid rate than it is built up outside the venturi. This causes an increase of the suction in the fuel bowl and holds back the fuel so that a leaner mixture will be delivered.

In order to correct the mixture for low temperature and for cold starting, the valve 37 is provided for cutting off the suction from the constant level chamber to a greater or less extent according to the temperature and also according to whether the engine is or is not running under its own power. Thermostat 75, when cold, is constructed and arranged to turn valve 37 and valve shaft 40 clockwise with respect to Figs. 6 and 8 to 14, inclusive, so that the valve slot 39 will be cut off from bowl passage 36—35—29 (Fig. 14). This leaves the fuel bowl exposed to substantially atmospheric pressure transmitted through tube 30 and passage 33—34—29 so that a very substantial increase of mixture richness is provided for cold starting. Valve aperture 44 is partly open to slot 45 for supplying starting air, though the air supplied through bleed passage 118, 116, 115 may be sufficient. It will also be noted that the piston 88 remains in its upper-most position, as shown in Fig. 6, during the cranking of the engine when it is cold, as the suction applied to cylinder 89 through the passageway 91 is not enough to overcome the pressure of the spring 90.

As soon as the engine starts to run under its own power, its speed will increase very substantially. For instance, the cranking speed may be something below 100 R. P. M., whereas the minimum running speed will be at least 300 or 400 R. P. M. The resulting build-up of suction posterior to the throttle draws the piston down immediately to an intermediate position approximately corresponding to that shown in Fig. 8, which partly opens shaped valve slot 39 to permit suction from the tube 38 (Fig. 9) to promptly reduce the pressure on the fuel in bowl 11 and lean out the mixture. At the same time, valve aperture 44 passes over center to expose a similar or slightly smaller portion of its area to hot air slot 45. This extra supply of hot air causes the engine to run somewhat faster than normal idling speed, as is necessary to overcome the resistance of the cold grease and oil.

Piston 88 and plug valve 37 also act as a step-up and pick-up instrumentality for enriching the mixture supplied by the carburetor when the suction posterior to the throttle drops, as in case of opening of the throttle for acceleration or the application of an increased load to the engine which reduces its speed. Under such condition, piston 88 is lifted by its spring 90 from the position in Fig. 10 to that of Fig. 12, which rotates the plug valve between the positions of Figs. 11 and 13 to somewhat reduce the suction transmitted through connection 36, 35, 29, to the fuel bowl and open valve aperture 44 to atmospheric slot 45 and, consequently, increase the pressure on top of the fuel in the bowl. Lost motion slot 92 makes the plug valve somewhat less sensitive to suction changes during normal running. The increase in pressure in the mixture conduit is also transmitted directly to the fuel bowl through tube 87 and the portion of valve slot 39 which remains open.

The combination starter switch and throttle control insures that the throttle disk remains closed in cold starting, even though control lever 54 is actuated by the accelerator pedal to close the starter circuit switch. On the other hand, for warm starting, when fumes rising from the main nozzle may collect beneath the throttle disk so as to impede restarting, the throttle disk moves with control lever 54, during its switch closing action, to release such fumes and vapors. Latch or detent elements 48 and 49 provide for variable locking action of the throttle valve in accordance with the temperature and, correspondingly, the quantity of fuel fumes which may be trapped beneath the valve. This detent mechanism also causes the throttle disk to function somewhat as an ordinary choke valve for cold starting conditions in that the valve is held tightly closed at lowest temperatures so that a maximum of suction may be applied to the main nozzle during cranking.

Operation during starting and warming up, as well as under accelerating conditions, is improved in the carburetor here disclosed due to its superior vaporizing qualities which result in the better transmission of fuel to the cylinders without the necessity of supplying the great excesses of fuel which, heretofore, have been necessary both in cold starting and in acceleration and without substantial heat which lowers volumetric efficiency. This is because the main nozzle is constantly in a high pressure zone, even during idling, because of the discharge of the fuel stream against the crescent shaped air blanket emerging around the edge 123 of the throttle, and because of the elimination of the valve posterior to the nozzle (the usual position of the throttle valve).

Various features may be used independently of others and details may be modified as will occur to those skilled in the art. The exclusive use of all modifications as come within the scope of the appended claims is contemplated.

I claim:

1. In a charge forming device for internal combustion engines, a mixture conduit, a throttle valve therein, a first element positively movable with said valve, an operating member yieldingly connected to said valve, a main fuel nozzle discharging into said conduit posterior to said valve, a second element engageable with any one of a plurality of points on said first element, and thermostatic control means operable responsive to low temperatures to move said second element into engagement with any one of said points of said first element to variably limit opening movement of said valve from its idle position, whereby said throttle valve serves as a choke valve during starting of the engine.

2. In a charge forming device for internal combustion engines, a mixture conduit, a throttle valve therein, an element rigidly movable with said valve, an operating member yieldingly connected to said valve, a latch movably mounted adjacent said element and adapted to interfere with movement of said element during valve opening movement of said operating member to limit opening of said valve and means responsive to operating suction in said conduit posterior to said throttle valve for shifting said latch away from its interfering position with respect to said element.

3. The combination described in claim 2 further including a thermostat affecting the positioning of said element.

4. In a charge forming device, a mixture conduit, a throttle valve in the air entrance portion thereof, a main fuel nozzle discharging into said conduit posterior to said valve, an element movable with said valve, an operating member yieldingly connected to said valve, a latch movably positioned adjacent said element for cooperating therewith, and a thermostatic control for said latch for shifting the same into the path of said element, at low temperatures, to limit opening of said valve.

5. In a charge forming device, a mixture conduit, a throttle valve in the air entrance portion thereof, a main fuel nozzle discharging into said conduit posterior to said valve, an element movable with said valve, an operating member yieldingly connected to said valve, a device in position to be engaged by said operating member when said throttle valve is in the proper position for warm starting of the associated engine, a latch movably positioned adjacent said element for cooperating therewith, and a thermostatic control for said latch for shifting the same into the path of said element, at low temperatures, to limit opening of said valve.

6. In a charge forming device, a mixture conduit, a throttle valve in the air entrance portion thereof, a main fuel nozzle discharging into said conduit posterior to said valve, an element movable with said valve, an operating member yieldingly connected to said valve, a device in position to be necessarily actuated by said operating member in warm starting of the engine and after partial opening of said throttle valve for releasing fumes trapped beneath said valve, a latch movably positioned adjacent said element for cooperating therewith, and a thermostatic control for said latch for shifting the same into the path of said element, at low temperatures, to limit opening of said valve.

7. In a charge forming device for an internal combustion engine, a mixture conduit, a throttle valve in the air entrance portion thereof, a main fuel nozzle discharging into said conduit posterior to said valve, an element movable with said valve, an operating member yieldingly connected to said valve, an engine starter switch having a switch actuating means positioned to be actuated by said operating member upon predetermined valve opening movement of said operating member, latch mounted adjacent said element for cooperating therewith, and a thermosatic control for shifting said latch, at low temperatures, into position to limit opening of said valve to the proper position for starting independent of valve opening movement of said operating member to close said switch and, at high temperatures, into position to clear said element, thus permitting opening of said valve upon movement of said operating member during high temperature starting to release fumes trapped beneath said valve.

8. In a charge forming device for internal combustion engines, a mixture conduit, an anterior throttle valve therein, an operating lever yieldingly connected to said valve, an engine starter switch having an actuating element positioned to be actuated by said lever upon predetermined movement thereof in the throttle opening direction, an element rigidly movable with said throttle valve, and a thermostatic latch mounted to abut said element at low temperatures to limit opening of said throttle valve to the proper position for starting as said lever is moved to actuate said switch, said latch being shifted at high temperature to clear said element and thereby permit opening of said valve upon switch closing movement of said lever to release vapors and fumes from said conduit prior to restarting of the engine.

9. A charge forming device, as described in claim 8 in which said element movable with said throttle valve has a plurality of portions disposed to be selectively engaged by said latch at different temperatures to variably limit throttle valve opening movement.

10. In a charge forming device, a mixture conduit, a throttle valve therein, a fuel supply reservoir, a fuel discharge nozzle connecting said reservoir and said conduit, a pressure connection between the upper part of said reservoir and said mixture conduit posterior of said throttle for adjusting the pressure in said reservoir and consequently the discharge from said nozzle in accordance with mixture conduit pressure, and means responsive to engine temperature and to pressure conditions in said conduit for changing the effective size of said pressure connection upon substantial variation in the mixture conduit pressure.

11. A charge forming device as described in claim 10 in which said pressure connection has a branch leading to a zone of substantially atmospheric pressure.

12. A charge forming device as described in claim 10 in which said pressure responsive means comprises a valve in said pressure connection and a suction motor responsive to variation of suction in said mixture conduit and operatively connected to said last mentioned valve.

13. In charge forming device, a mixture conduit, a throttle valve therein, a fuel reservoir, a fuel supply nozzle connecting said reservoir and said conduit posterior to said valve, reservoir pressure control passage means connecting the upper part of said reservoir with said conduit posterior to said valve and a zone of substantially atmospheric pressure, and a combination starting and step-up instrumentality comprising a valve in said passage means controlling the effective communication between said bowl and said conduit, a suction motor operatively connected to said valve for shifting the same upon increase in mixture conduit suction to decrease the effective pressure applied to the fuel in said reservoir for the supply of a relatively lean mixture and conversely, upon decrease of mixture conduit suction to increase the effective pressure applied to said fuel for the supply of a relatively rich mixture, and a thermostat also affecting said valve for shifting the same to its mixture enriching position at low temperatures.

14. A charge forming device as described in claim 13 in which said valve in said passage means controls the connection between said bowl and both said conduit and said atmospheric zone whereby at low temperatures and low mixture conduit suctions the effective size of said connection to said conduit is reduced and that of said atmospheric connection is increased.

15. In a charge forming device, a substantially cylindrical mixture conduit, a butterfly anterior throttle valve therein, and a main fuel nozzle discharging into said conduit in a direction toward said valve and in line with the approximate center of the crescent shaped blanket of air passing the edge of said valve, particularly, in the part throttle range for aiding in atomizing the fuel at times of relatively low flow through said conduit.

16. In a starting device for an internal combustion engine, a combined mechanism for automatically regulating the supply of fuel and air to the engine and for energizing the starter to crank the engine, comprising, in combination, a fuel-air mixture conduit for the engine, a source of fuel subject to pressures in said conduit, a throttle valve in said conduit, and operating member yieldingly connected to said valve, an engine starter switch having an actuating element positioned to be actuated by movement of said operating member to open said throttle, a fuel nozzle connected to said source and positioned to discharge fuel into said conduit at a point adjacent the air stream passing said valve, and a thermal responsive means for regulating the ratio of air to fuel supplied by said throttle and said nozzle, including a first device having a connection to said throttle restricting the degree of throttle opening imparted by movement of said operating member regardless of the degree of movement required of said member to operate said starting switch, whereby a crescent-shaped blanket of air is formed by said restricted throttle opening during cranking to atomize the fuel delivered from said fuel nozzle, and a second device having a control for the fuel pressure on said fuel source to thereby regulate the flow through said fuel nozzle into said air stream passing said valve.

17. In a starting device for an internal combustion engine, a combined mechanism for automatically regulating the supply of fuel and air to the engine and for actuating the starter to crank the engine comprising in combination a mixture conduit, a throttle valve in said conduit, an operating member for said valve, a source of fuel having a pressure connection with said conduit, a valve metering device in said connection, a fuel nozzle in said conduit and connected to said source, a thermal responsive means for regulating the ratio of air to fuel supplied by said throttle and said nozzle, comprising a device having an inter-connection to said throttle for restricting the degree of throttle opening to proper starting position regardless of the degree of movement of said operating member, and a connection to the valve metering device in said pressure connection for varying the effect of conduit pressures on said source of fuel, and thereby the flow from said nozzle.

18. In a charge-forming device for an internal combustion engine, a mixture conduit, a combined throttle and choke valve in said conduit, a manual operator for said valve, a source of fuel having a pressure connections with said conduit, a variable metering device in said connection, a fuel nozzle in said conduit and connected to said source, a thermal responsive means for restricting said valve opening and for regulating the fuel supplied from said nozzle comprising a device having a connection to said throttle for restricting the degree of throttle opening imparted by movement of said manual operator when said engine is cold and a connection to the variable metering device in said passage for varying the effect of conduit pressures on said source of fuel, and thereby the fuel flow from said nozzle, said nozzle and said valve being so located with respect to one another that fuel is discharged by conduit pressures from said nozzle into said conduit in a direction in line with the approximate center of the crescent-shaped blanket of air passing the edge of said valve when in said restricted open positions.

19. In a charge forming device, a mixture conduit, a throttle valve therein, a venturi tube within said conduit spaced from the wall thereof and located posterior of said throttle valve, a fuel bowl, a fuel discharge nozzle posterior of said throttle valve extending from the lower part of said reservoir into said venturi tube, and a bowl pressure control passage extending from the upper part of said reservoir into said venturi tube on the side of said fuel nozzle away from said throttle valve whereby the air flow through said passage during idling and early part-throttle operation flows past said nozzle toward said throttle valve and aids in vaporizing the fuel discharged.

References Cited in the file of this patent
UNITED STATES PATENTS

| | | |
|---|---|---|
| 1,123,955 | Tice | Jan. 5, 1915 |
| 1,612,306 | Nelson | Dec. 28, 1926 |
| 1,948,136 | Sands | Feb. 20, 1934 |
| 2,023,647 | Schmid | Dec. 10, 1935 |
| 2,029,142 | Wemhoner | Jan. 28, 1936 |
| 2,053,094 | Markham | Sept. 1, 1936 |
| 2,087,116 | Prentiss | July 13, 1937 |
| 2,127,444 | Emerson | Aug. 16, 1938 |
| 2,189,219 | Olson | Feb. 6, 1940 |
| 2,116,608 | Seignol | May 10, 1940 |
| 2,212,258 | Beck | Aug. 20, 1940 |
| 2,212,926 | Wirth | Aug. 27, 1940 |
| 2,225,943 | Schweiss | Dec. 24, 1940 |
| 2,229,851 | Hufford | Jan. 28, 1941 |
| 2,249,221 | Moseley | July 15, 1941 |
| 2,262,632 | Bicknell | Nov. 11, 1941 |
| 2,281,176 | Smith | Apr. 28, 1942 |
| 2,381,751 | Hunt | Aug. 7, 1945 |
| 2,533,551 | Boyce | Dec. 12, 1950 |